S. CHIGER.
CASH TILL.
APPLICATION FILED APR. 8, 1911.

1,084,608.

Patented Jan. 20, 1914
6 SHEETS—SHEET 1.

Witnesses.

Inventor
Siegmund Chiger

S. CHIGER.
CASH TILL.
APPLICATION FILED APR. 8, 1911.

1,084,608.

Patented Jan. 20, 1914.
6 SHEETS—SHEET 2.

Witnesses:
M. Schmid
C. Heymann

Inventor
Siegmund Chiger
by B. Singer
atty

S. CHIGER.
CASH TILL.
APPLICATION FILED APR. 8, 1911.
1,084,608.
Patented Jan. 20, 1914.
6 SHEETS—SHEET 3.
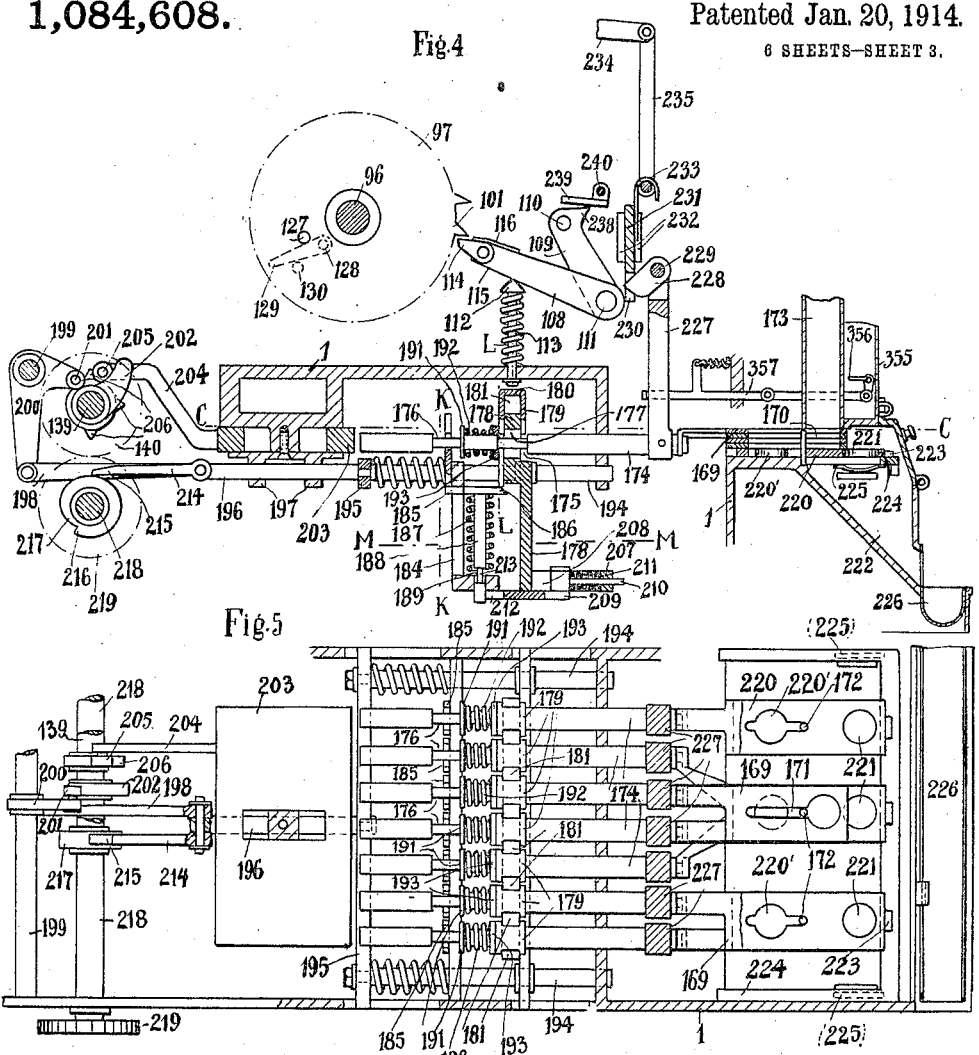
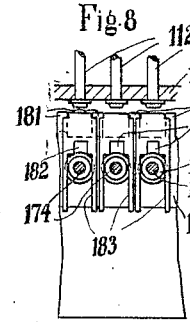
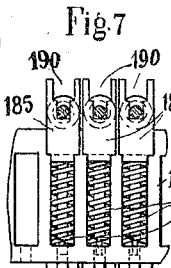
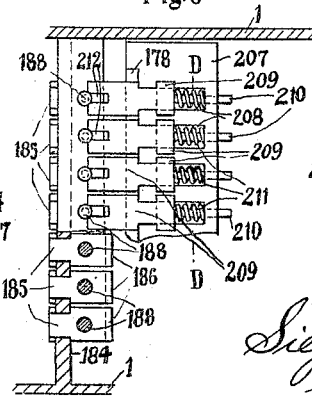
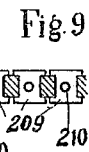
Inventor: Siegmund Chiger S. CHIGER.
CASH TILL.
APPLICATION FILED APR. 8, 1911.
1,084,608.
Patented Jan. 20, 1914.
6 SHEETS—SHEET 4.
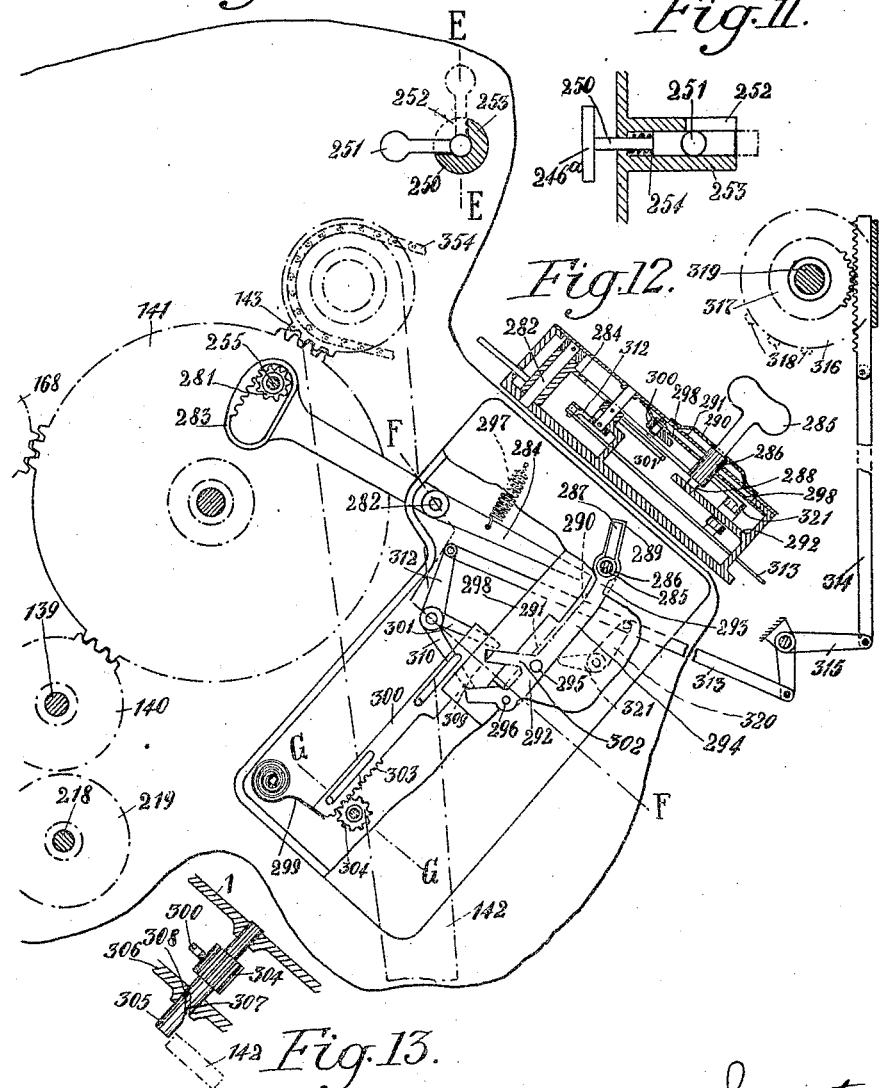

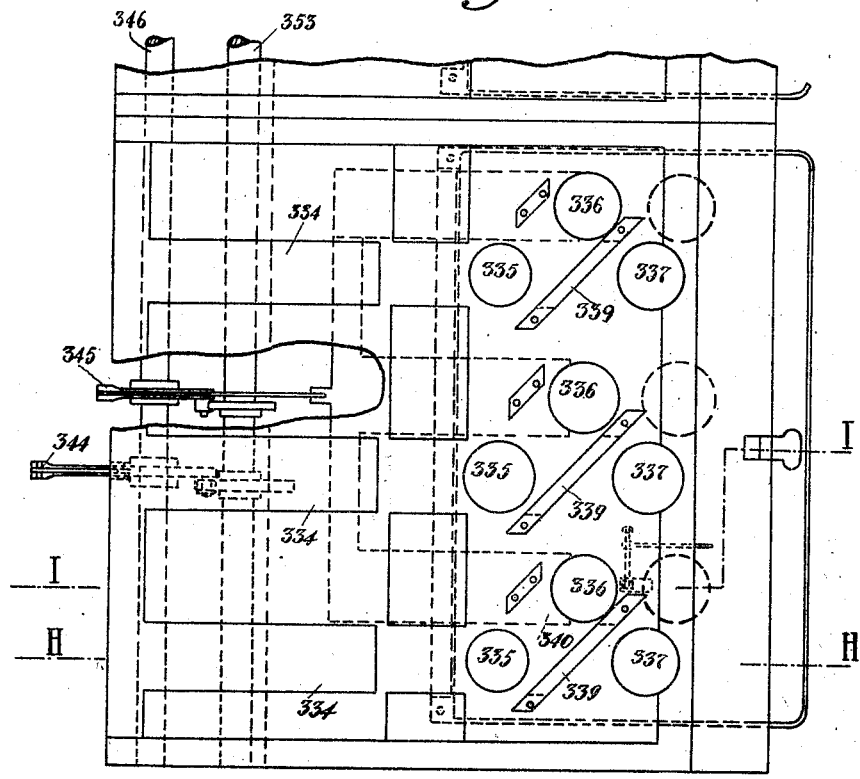

S. CHIGER.
CASH TILL.
APPLICATION FILED APR. 8, 1911.
1,084,608.
Patented Jan. 20, 1914.
6 SHEETS—SHEET 6.
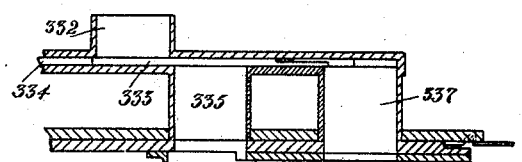
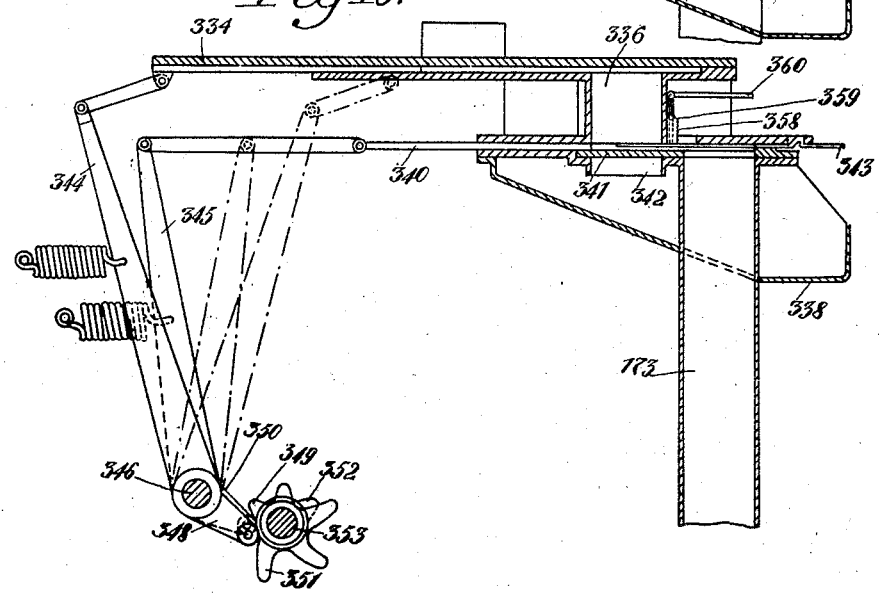

UNITED STATES PATENT OFFICE.

SIEGMUND CHIGER, OF BERLIN, GERMANY.

CASH-TILL.

1,084,608. Specification of Letters Patent. Patented Jan. 20, 1914.

Application filed April 8, 1911. Serial No. 619,894.

*To all whom it may concern:*

Be it known that I, SIEGMUND CHIGER, a subject of the Emperor of Austria-Hungary, residing at No. 65 Kurfürstendamm, Berlin, in the Kingdom of Prussia, Germany, have invented a new and useful Cash-Till, of which the following is a specification.

My invention relates to improvements in cash tills having a crank handle and number wheels which indicate the amount received, the amount to be paid and the change or balance and having coin ejecting members which may be coupled with propelling members by means of controlling members influenced by the teeth of shifting drums, which propelling members move the ejecting members which eject the difference between the amount to be paid and a higher amount paid in.

Figure 1:
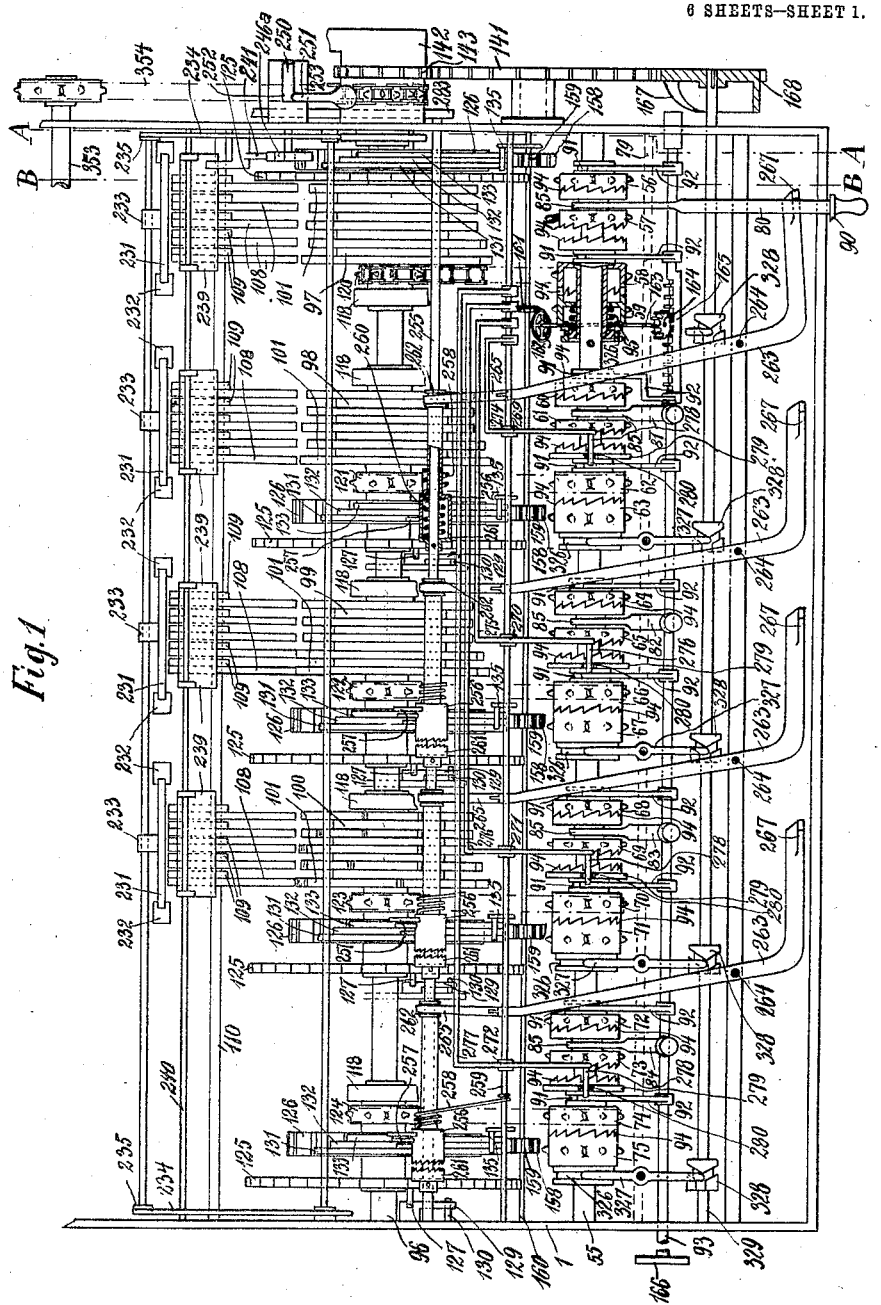
Figure 2:
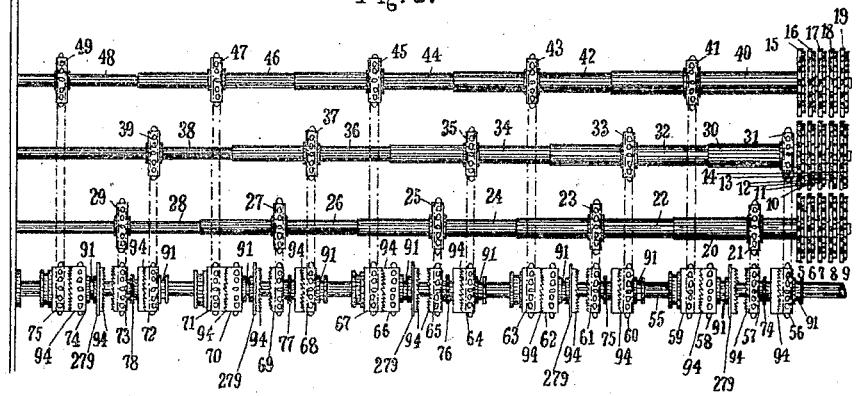
Figure 3:
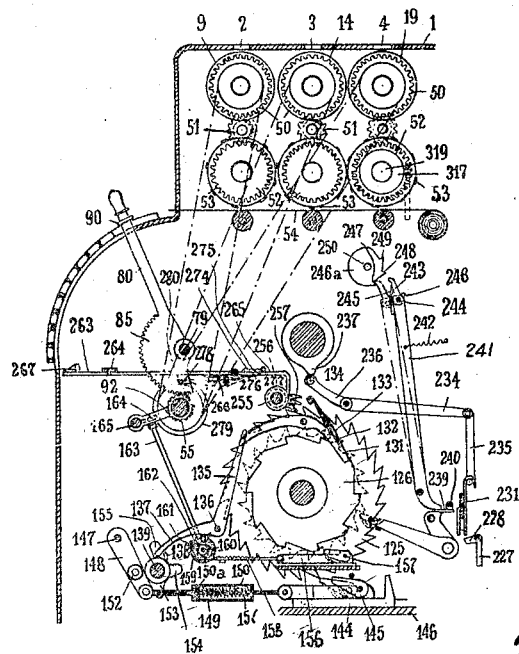

The present invention is shown in the accompanying drawings in which,

Figure 1 is a plan of the internal arrangement of the till; Fig. 2, a plan view of the figure indicating mechanism; Fig. 3, a section on the line A—A of Fig. 1; Fig. 4, a section on the line B—B of Fig. 1; Fig. 5, a section on the line C—C of Fig. 4; Fig. 6, an underneath view combined with a section on the line M—M of a portion of Fig. 4; Fig. 7, a section on the line K—K of Fig. 4; Fig. 8, a section on the line L—L of Fig. 4; Fig. 9 is a section on the line D—D of Fig. 6; Fig. 10 is a view of parts which act in conjunction with the cash till handle or crank; Fig. 11 is a section on the line E—E of Fig. 10; Fig. 12 is a section on the line F—F of Fig. 10; Fig. 13 is a section on the line G—G of Fig. 10; Fig. 14 is a plan view of the member for inserting a coin into the till; Fig. 15 is a view on the line H—H of Fig. 14; Fig. 16 is a section on the line I—I of Fig. 14.

Apertures 2, 3, 4 (Fig. 3), are provided in the casing 1 of the till. Under the aperture 2 number wheels 5, 6, 7, 8, 9, under the aperture 3 number wheels 10, 11, 12, 13, 14, and under the aperture 4 number wheels 15, 16, 17, 18 and 19 are located (Fig. 2). The number wheels 5–9 serve for indicating the amount received, the number wheels 10–14 serve for indicating the amount to be paid, and the number wheels 15–19 serve for indicating the difference between the amount paid and the amount to be paid, that is to say, the change. The number wheels 5, 10 and 15 serve for indicating (in the case of German currency) the pfennig units, the number wheels 6, 11, 16 serve for indicating the pfennig tens, the number wheels 7, 12, 17 serve for indicating the mark units, the number wheels 8, 13, 18 serve for indicating the mark tens, and the number wheels 9, 14, 19 serve for indicating the mark hundreds. The number wheel 5 is mounted on a hollow shaft 20 which carries a chain wheel 21 firmly keyed thereon. The number wheel 6 is mounted on a hollow shaft 22 on which a chain wheel 23 is firmly mounted. The number wheel 7 is mounted on a hollow shaft 24 on which a chain wheel 25 is firmly mounted. The number wheel 8 is firmly mounted on a hollow shaft 26 on which a chain wheel 27 is also firmly mounted. The number wheel 9 is firmly mounted on a shaft 28 on which a chain wheel 29 is firmly mounted. The number wheel 10 is connected by means of the hollow shaft 30 with the chain wheel 31, the number wheel 11 by means of the hollow shaft 32 with the chain wheel 33. The number wheel 12 by means of the hollow shaft 34 with the chain wheel 35, the number wheel 13 by means of the hollow shaft 36 with the chain wheel 37, the number wheel 14 by means of the shaft 38 with the chain wheel 39. The number wheel 15 is connected by means of the hollow shaft 40 with the chain wheel 41, the number wheel 16 by means of the hollow shaft 42 with the chain wheel 43, the number wheel 17 by means of a hollow shaft 44 with the chain wheel 45, the number wheel 18 by means of the hollow shaft 46 with the chain wheel 47, and the number wheel 19 by means of the shaft 48 with the chain wheel 49.

Each number wheel is firmly connected with a toothed wheel 50. These toothed wheels 50 gear with toothed wheels 51 freely mounted on an intermediate shaft, with which toothed wheels 51 other toothed wheels 52 gear which are provided with projections 53 formed as number or figure printing types. With each number wheel there corresponds a type wheel 52 by means of which figures or numbers corresponding to those visible beneath the apertures 2, 3, 4, of the casing may be printed on a paper band 54, which in order to be printed is moved past the type wheels in a suitable way. The means for moving the paper band are not shown in the drawings.

Five groups of chain wheels are provided on a shaft 55 (Figs. 1, 2 and 3). The first group of chain wheels on the shaft 55 consists of the chain wheels 56, 57, 58, 59, the second group of the chain wheels 60, 61, 62, 63, the third group of the chain wheels 64, 65, 66, 67, the fourth group of the chain wheels 68, 69, 70, 71, the fifth group of the chain wheels 72, 73, 74, 75. The chain wheel 56 drives the number wheel 10 by means of a chain and chain wheel 31, the chain wheel 60 drives the number wheel 11 by means of chain wheel 33, the chain wheel 64 drives the number wheel 12 by means of the chain wheel 35, the chain wheel 68 drives the number wheel 13 by means of the chain wheel 37 and the chain wheel 72 drives the number wheel 14 by means of the chain wheel 39. The chain wheel 57 drives by means of the chain wheel 21 the number wheel 5, the chain wheel 61 by means of the chain wheel 23 the number wheel 6, the chain wheel 65 by means of the chain wheel 25 the number wheel 7, the chain wheel 69 by means of the chain wheel 27, the number wheel 8, the chain wheel 73 by means of the chain wheel 29, the number wheel 9. The chain wheel 59 drives by means of the chain wheel 41 the number wheel 15, the chain wheel 63 by means of the chain wheel 43 the number wheel 16, the chain wheel 67 by means of the chain wheel 45 the number wheel 17, the chain wheel 71 by means of the chain wheel 46 the number wheel 18, the chain wheel 75 by means of the chain wheel 49 the number wheel 19.

The chain wheels 57, 61, 65, 69, 73 are mounted on the shaft 55 so as to be freely revoluble but not displaceable and are firmly connected with toothed wheels 74 and 75, 76, 77, and 78 respectively. On a shaft 79 (Figs. 1 and 3) hand levers 80, 81, 82, 83, 84, are pivotally mounted and have toothed segments which are in engagement with the toothed wheels 74', 75', 76, 77, 78 and carry pointers or indicators 90, which, when the hand levers are turned on their axis move over scales which consist of the numerals 0—X and are placed on the wall of the casing at one side of the apertures through which the hand levers project. The shaft 79 is shown in Fig. 1 in dotted lines. The chain wheels 56, 58, 60, 62, 64, 66, 68, 70, 72, 74, are freely and displaceably mounted on the shaft 55. The wheels have annular grooves 91 in which forks 92 engage which are firmly connected with a rod 93. The rod may be moved to and fro longitudinally. The chain wheels 56–75 are provided on one side with clutch teeth 94 by means of which the displaceable chain wheels of each group may be alternately coupled with the chain wheels of their group which are non-displaceably mounted on the shaft 55.

The chain wheels 58 and 59 are coupled with one another by clutch teeth 94 which are held in engagement with one another by means of a spring 95. The clutch teeth are saw shaped so that the chain wheel 58 can move in one direction relatively to the chain wheel 59 without carrying the chain wheel 59 with it. The chain wheels 62, 63, 66, 67, 70, 71, 74 and 75 are arranged in similar manner to the chain wheels 58 and 59 and provided with springs 95.

On a shaft 96 (Fig. 1) shifting drums 97, 98, 99, 100 are revolubly but not displaceably mounted. Each shifting drum has rings of teeth 101. Opposite the rings of teeth 101 elbow levers 108, and 109 (Fig. 4) are pivotally arranged on a shaft 110. The two arms of each elbow lever are flexibly connected with one another at 111. The lower arm 108 of the elbow lever rests on a pin 112 which is pressed upward by a spring 113 and under the action of the spring holds the arm in its raised position. The front end of the lower arm of each elbow lever has a pawl 114 which is revolubly mounted at 115 and is pressed by means of a spring 116 mounted on the arm against the arm, so that the pawl can yield upward against the pressure of the spring 116, but must always carry the arm with it when downward pressure is exerted on it. The pawls 114 of the elbow levers project into the paths of the rings of teeth 101 of the shifting drums (Fig. 4).

The shifting drums are under the action of a helical spring 118, Fig. 1, one end of which is fixed on the hub of the respective shifting drum and the other end on a rod firmly connected with the casing.

Chain wheels 120, 121, 122, 123, serve for winding the springs 118, of which wheels, 120 is firmly connected with the shifting drum 97, 121 with the drum 98, 122 with the drum 99 and 123 with the drum 100. The chain wheel 120 is operated from the chain wheel 58, the chain wheel 121 from the chain wheel 62, the chain wheel 122 from the chain wheel 66 and the chain wheel 123 from the chain wheel 70. When these chain wheels are operated the drums are rotated in the direction indicated by the arrow, and the springs 69 are simultaneously wound. The chain wheel 74 operates a chain wheel 124 revolubly mounted on the shaft 96, which wheel is under the influence of a helical spring 118, one end of which is firmly connected with the hub of the chain wheel and the other end with the casing. The helical springs 118 tend to turn the drums and the chain wheel 124 to the left. Each of the chain wheels 120-124 is firmly connected with a toothed wheel 125 and a ratchet wheel 126. The chain wheels 120-124, toothed wheels 125 and ratchet wheels 126 are provided with contact pins 127 which in a given position encounter restrictedly movable contacts arranged on the casing 1. The movable contacts consist of arms 129 pivotal on fixed pins 128 and fixed contact pins 130, which latter limit the pivotal movement of the arms in one direction and retain the chain wheels 120-124 and the wheels connected with them against the pressure of the helical springs. The toothed wheels 125 have thirty teeth, the ratchet wheels 126, on the other hand, have only 10. Three spring loaded pawls 131, 132, 133, (Figs. 1 and 3), which are pivotally mounted on a pin 134, engage with each ratchet wheel 126. The front ends of the pawls are displaced relatively to one another through 1/30 of the periphery of the ratchet wheel. An arm 135 of a double-armed lever, which is pivotally mounted on the casing at 136, engages the other ends of the pawls. The other arm 137 of the lever is in contact with a cam 138 which is mounted on a shaft 139. A firmly keyed toothed wheel 140 (Fig. 10) is mounted on this shaft, which wheel with a gear wheel 141 revolubly mounted on the casing is operated by means of a toothed wheel 143 firmly connected with the cash till handle 142.

A slide piece 144 (Fig. 3) is displaceably mounted under each toothed wheel 125. These slide pieces have restrictedly pivotal, spring loaded pawls 145. The carriages move on straight guides 146 and are connected with levers 148, pivotally mounted on a shaft 147, by means of resilient bars which are formed in two parts. One part 149 of each bar is formed as a sleeve and the other part 150 has a projection 150ª. Between the parts 149 and 150 a spring 151 is interpolated, which allows of a displacement of the parts 149 and 150 relatively to one another when the part 150 is held fast, which may be done by the toothed wheel 125 being prevented from rotating. The levers 148 carry rollers 152 which encounter cam disks having cams 153, 154 and 155. The cam disks are firmly arranged on the shaft 139. On the rotation of the cam disks the levers 148 have a reciprocating motion imparted to them. In the movement to the left the pawls 145 encounter a tooth of the wheels 125 and turn these wheels to the extent of one tooth interval, that is to say, 1/30 of the periphery.

A slide piece 156 is displaceably located under each ratchet wheel 126. These slide pieces have spring controlled pawls pivotal on a pin 157 and held obliquely upward by the springs, so that when displaced to the left they engage a tooth of the ratchet wheels and can turn these through 1/10 of the periphery. The slide pieces are connected with rack bars 158 with which toothed wheels 159 engage. These toothed wheels 159 are firmly mounted on a shaft 160 which has a bevel wheel 161 firmly keyed thereon which gears with a bevel wheel 162. The bevel wheel 162 is mounted on a shaft 163 which is operated by a toothed pinion 164 by means of a rack bar 165 which is firmly connected with the rod 93, (Fig. 1). One end of the rod 93 has a handle 166, the other end is arranged opposite a beveled, annular projection 167 of a toothed wheel 168 standing in engagement with the gear wheel 141. The coin ejecting slides or drawers 169, (Figs. 4 and 5), several of which may be provided one below the other, have apertures 170, each of which can receive a coin. The apertures 170 are formed at one side with slot like extensions 171. In these slots 171 a pin 172 firmly connected with the casing engages, which pin serves as a stop for the coin contained in the openings 170 and holds in the positions of repose, by means of the coin, the respective slide, the openings 170 lying concentrically to the coin piling tubes 173 arranged over the ejecting slides 169. Each coin ejector is connected with a rod 174. The rods 174 have annular contractions 175 and 176. The rods 174 are passed through apertures 177 of four displaceably mounted bars 178, which may be moved to and fro independently of one another, as will be hereinafter described. Yokes 179, so-called riders, are mounted on each of the bars 178, a rider being mounted on the respective bar over each rod. The upper transverse wall 180 of each rider is cut out laterally. In these recesses or cut out parts projections 181 on the bars 178 engage, so that the riders must always move vertically. Each rider is seated beneath a pin 112, so that these pins depress the riders when they are themselves depressed by the lower arm of the corresponding elbow lever. Each rider is slotted at its lower end. The slot has two superimposed parts, the upper one of which is narrower than the lower, (Fig. 8). The upper part 182 fits into the annular recess 175 of the bar, the lower part 183 of the slot has such a clear width that the full section of the bar can pass through this slotted part. In the position of the bars 174 shown in Fig. 4 the riders may be so far lowered that the narrow slotted part 182 passes into the constriction 175, whereby the bars 174 are coupled with the riders 179 and the bars 178.

In the position shown in Fig. 4 the riders 179 rest on elbow pieces 185 mounted so as to be capable of rising and falling, in a stationary plate 184, the horizontal arms of which elbow pieces are beveled at their ends 186 in order that the riders may easily slip off the arms when they are moved to the left against the arms. Each elbow piece 185 is acted on by a spring 187, and is connected with a pin 188 which has an annular recess 189. The vertical arm of each elbow piece 185 has a slot 190 which is enlarged stepwise increasing upward, (Fig. 7). The broader part of the slot is of such a clear width that the full section of the rod 174 can pass through the broad part. On the other hand the narrower part of the slot allows only the tapered part 176 of the rod to freely pass through when the elbow piece is raised, as shown in Figs. 4 and 7.

Each rod 174 has a ring 191. Against this ring a spring 192, which acts on a ring 193 movable on the rod, bears, the said ring contacting with the surface of the rider. The spring 192 causes a displacement of the rod 174 to the left (see Fig. 4) when the ejector slide 169 connected with the rod contains no coin.

The bars 178 are connected by means of a rod 194 with plates 195 which are coupled with rods 196 which are displaceably mounted in straight guides 197. In the drawings only one bar 178, one plate 195 and one rod 196 are shown, as the representation of the other bars 178, plates 195 and rods 196 would only mean a repetition of the arrangement. A draw bar 198 engages with the rod 196 and is flexibly connected with an elbow lever 200 pivotally mounted at 199. The elbow lever 200 has a roller 201 which travels on the periphery of a cam disk 202. The cam disk is firmly mounted on the shaft 139 and has a cam which on the rotation of the shaft moves the rod 196 together with the plate 195 and the bar 178 to the right, in order to push forward the rods 174 when these are coupled with the bar 178 by means of the riders 179.

Four plates 203 are displaceably mounted in fixed guides in front of the free ends of the rods 174. In the drawings only one plate 203 is shown as the others are formed and work in a similar way. On the displacement of the plate 203 to the right it encounters the rods 174 and thereby moves the slide 169 somewhat to the right. The plates 203 serve for shaking the rods 174 and the coin ejectors 169, in order to insure the correct position of the coin in the apertures 170 of the ejecting slides. Each plate 203 is connected with a rod 204 the end of which has a roller 205, which travels on the periphery of a cam disk provided with several cams 206.

The bars 178 also carry plates 207 which are provided with recesses 208. In these recesses movable slide pieces 209, so-called grippers, are arranged which have pins 210 which pass through apertures in the plate 207 and are guided in these apertures. The grippers are acted on by springs 211 which tend to move the grippers always to the left and to press them against the pins 188. At the front end each of the grippers has a slot 212, (Fig. 6). Constricted parts 213 of the pins 188 fit into these slots when the pins are depressed by means of the riders 179. The pins are then retained by the grippers in the lowered position. The pins 188 are released by the grippers when these latter are moved with the bar 178 to the right. The release of the grippers 209 from the pins 188 is preferably effected by means of the cam disk 202 and the parts operated by it, but it may also be done in any other suitable way. For this object the rod 196 is connected with a lever 214. The lever may be held in an approximately horizontal position by a stop mounted on the rod 196, but it may turn freely upward on its carrying axis. So long as the rod 196 is in the position of repose, the end 215 of the lever 214 rests on a disk 217 provided with a cam 216, which disk is firmly mounted on a shaft 218. This shaft is operated by a toothed wheel 219 which is in engagement with the toothed wheel 140 of the shaft 139. In a given position the cam 216 comes into engagement with the lever 214. When the shaft 218 is rotated to the left the cam 216 pushes the lever 214, the rod 196 and the bar 178 to the right, whereby the grippers 209 are released from the pins 188. Each rod 196 is connected with a similar arrangement, so that in all four disks 217 must be assumed to be mounted on the shaft 218.

A discharging slide or drawer 220 is mounted on the casing 1 beneath the ejecting slides of each coin pile and is movable by hand. The slide has an aperture 220' and a second aperture 221. The aperture 220' is at least of equal width to the apertures 170 of the ejector slide 169, in order that the coin may be removed from the coin piling tubes 173 when the aperture 220' passes under the aperture 170 by the drawer 220 being drawn forward. The displacement of the discharging slide or drawer 220 is limited by a pin 172. The second aperture 221 of the discharging slide and drawer 220 allows the coin pushed forward by means of the respective ejecting slide 169 to drop into the chamber 222 of the cash box and also serves to enable each discharging drawer to be seized by hand and drawn to the right for the purpose of emptying the respective coin piling tubes 173.

Projections 223 of a yoke 224 which is displaceably mounted on the casing 1 are located in front of the ends of the discharging slides or drawers 220. The yokes rest on leaf springs 225 which tend to press the arms of the yokes against a guide surface. The springs 225 allow the yokes to tilt downward and push them so far to the left that the projections 223 snap into the apertures 221, whereby the yoke is coupled with all the discharging slides 220 and by drawing forward the yoke 224 all the coin piling tubes are simultaneously emptied. The coin passes out of the chamber 222 into the receiver 226 outside the casing.

A rod 227 on which a pawl 228 is pivotally mounted at 229, is fixed on each rod 174, and on the displacement of the rod 174 to the left the pawl can slide up the back of the corresponding elbow lever 108, 109, so that on the depression of the arm 108 by means of one of the teeth 101, the shifting drum is lifted. Each pawl 228 engages in a recess 230 of a vertically movable plate 231 which is mounted in guide bars 232. This plate is pushed upward by the lifting of at least one of the pawls 228. In the lowered position the plate 231 serves as a stop for the elbow lever 108, 109, and thus prevents the movement of this lever to the right. In a raised position it releases the elbow lever, so that this can rock to the right without influencing the riders 179. The cash till has four plates 231. Each plate has a yoke 233 overlapping a traverse 235 connected with levers 234, mounted in the casing. One lever 234 has an arm 236 (Fig. 3) which comes in contact with a cam 237 on a disk which is connected with the cash till handle 142. So long as the cash till handle is in a position of repose, the lever arm 236 is in contact with the cam and this presses the arm downward, so that the plates 231 remain raised.

The arms 109 (Fig. 4) of the elbow levers have projections 238 on which bars 239 rest which are firmly connected with a shaft 240 which is mounted in the casing. An arm of a lever 241 (Fig. 3) engages the bar 239, which lever is under the action of a spring 242. The upper end of the lever 241 has a tooth pawl 243 which is pivotally mounted at 244 and pressed by means of a spring 245 against a stop 246 on the lever, so that the pawl of the lever may be turned to one side against the pressure of the spring. The pawl 243 engages a disk 246$^a$ revolubly mounted on the casing wall 1, which disk has teeth 247, 248, 249. A handle 251 (Figs. 1, 10 and 11) is fixed on the shaft 250 of the disk, which handle engages in a rectangularly shaped slot 252 of a sleeve 253 fixed on the casing. The shaft of the disk is revolubly and displaceably mounted in the sleeve and is acted on by a spring 254, which tends to axially displace the disk. The axial displacement of the disk takes place automatically when this disk has come thrice into engagement with the teeth of the disk by means of the lever 241 and the pawl 243 has successively moved the teeth 247–249. The three progressive movements of the disk moves the handle 251 out of the radially directed part of the slot 252 into the axially directed part of the same, whereby the spring 254 is released and the shaft 250 moves into the path of the handle 142 and thus prevents the further rotation of the handle.

A means is provided over the pawls 131, 132, 133, (Fig. 3) of each ratchet wheel 126, which enables the pawls to be successively lifted off the respective ratchet wheels and allows of a return of the ratchet wheels and the indicating mechanism coupled with them through 1/10 of the periphery, in order that the cash till may give the correct change and indicate the correct balance when the amount received is at least one decimal larger than the amount to be paid. Axially displaceable sleeves 256 are arranged on a shaft 255 over the four ratchet wheels 126, which sleeves have finger-like projections 257. These projections are arranged displaced relatively to one another, so that on the rotation of the sleeve 256 to the right, the lowermost projection 257 first depresses the pawl 131, then the next projection the pawl 132 and finally the upper projection the pawl 133 in such a way that the pawls successively release the ratchet wheels 126 and these each time run backward under the influence of the helical springs 118 to the extent of 1/30 of the periphery. The sleeves 256 are connected with the ends of springs 258, the other ends of which springs are secured to a rod 259 (Fig. 1). The springs hold the sleeves 256 in the position of repose and are stretched on the rotation of the sleeve for the purpose of lifting the pawls 131, 132 and 133. A spring 260 which bears on the one hand on the sleeve wall and on the other hand on a clutch disk firmly connected with the shaft 255, is provided in each sleeve 256, while the teeth of the clutch disk may engage in suitably formed recesses in the sleeve 256. The spring 260 constantly tends to release the sleeve 256 from engagement with the clutch disk 261. Four similarly shaped sleeves 256 and four similarly shaped clutch disks are arranged on the shaft 255.

Each sleeve 256 has an annular groove 262 which may be brought into engagement with a lever 263 for throwing the apparatus into and out of action. The levers 263 are pivoted at 264. The arm of the lever which acts on the sleeve is provided with an extension 265 (Fig. 3) formed with a hooked part which may be turned downward against the pressure of a leaf spring 266 mounted on the lever, and brought into engagement with the annular groove of the sleeve. The other arm of the lever projects into the lowermost part of the path of each of the hand levers 80, 81, 82, 83, which corresponds to the figure X on the scale, and has an inclined cam 267 which the respective hand lever pushes and thereby causes the movement for bringing into action the operating lever 263. In order that the levers 263 may come into engagement with the annular grooves of the sleeves 256, two-armed levers 269, 270, 271, 272, (Fig. 1), are mounted on a shaft 259, which levers carry at one end rods 274, 275, 276, 277 and at the other end a pin 278 which encounters a disk 279. The disks are connected with the chain wheels and have a recess 280 (Fig. 3). The pins 278 enter the recesses so long as the chain wheels are in the zero position, while the hooked ends of the levers 263 are raised. If, however, the chain wheels are turned by means of the hand levers 80, 81, 82, 83 in order to adjust them to any suitable number beyond zero, the pins 278 are expelled from the recess 280 of the disks 279, the lever arms connected with them raised and the rods 274-277 depressed, which move the hooked ends of the levers 263 into the annular grooves of the sleeves 256, whereupon the sleeves 256, by turning the hand levers 80, 81, 82, 83, up to the number X of the scale, may be brought into engagement with the clutch disks 261.

A toothed wheel 281 (Fig. 10) is mounted on the shaft 255, which wheel is in engagement with a toothed segment 283 pivoted on the wall of the casing at 282. The toothed segment is connected with a lever arm 284 which may be moved by means of a key 285 (Figs. 10 and 12). The key has an enlarged part 286, a blade 287 and a cylindrical projection 288 and fits in a key hole 289 of a device resembling a lock, which has for its object to lock the cash till handle 142 and only allow of the cash till being operated by the possessor of a suitable key. In the lock plates 290, 291, 292, are arranged one above the other. The outer plate 290 contains the key hole 289 and a slot 293 connected therewith, the width of which is equal to the diameter of the key shank, so that the edges of the plate engage over the enlarged part 286 of the key. The slot 293 and a slot 294 arranged in the plate 291 are circular in form in their parts lying nearest to the key hole, but are otherwise straight. The plate 292 forms a bottom on which the cylindrical projection 288 of the key can slide and has holes 295, 296, of different sizes, the clear widths of which correspond to the differently sized cylindrical projections of the keys. The enlarged part of the key is guided in the slot 294 so long as the cylindrical projection of the key slides on the bottom 292, without entering the hole 295. On the key being moved from the key hole to the hole 295 the enlarged part of the key carries the lever arm 284 with it until it slips off the key and under the action of a spring 297 returns to the initial position shown. By the lever 284 being carried along with the key the shaft 255 is turned, so that the finger-like projections on the sleeves 256 can engage the pawls 131, 132, 133. During the displacement of the key in the slots 293 and 294 the plate 298 prevents the key being turned around on its axis. When the key is inserted in the hole 295 the blade is beneath the plate 298 and can then be turned. In doing this it encounters a bar 300, which is displaceably mounted and is under the action of a spring 299, carries this bar and an arm 301 of an elbow lever with it until the key blade is beneath the aperture 302 of the plates 298, 290, 291, whereupon the key may be withdrawn. The bar 300 is formed at 303 as a rack bar which engages with a toothed wheel 304 which is connected with a stop pin 305. This serves for preventing the cash till handle 142 being turned by unauthorized persons. The stop pin 305 is revoluble in a wall 306 (Fig. 13) of the casing and has a spiral groove 307 in which a tooth 308 on the wall engages, so that the stop pin during its rotation is also axially displaced. The key fitting in the hole 296 has a shorter blade than the other key. This blade engages a nose 309 on the bar 300 and an arm 310 of the elbow lever. The places at which the key blades act on the bar are so arranged that each can only be reached by the respective key.

The elbow lever has an arm 312 which is connected by rods 313, 314, and an elbow lever 315 with a rack bar which gears with a toothed wheel 317 connected with a type wheel 316. The type wheel 316 carries the types 318 bearing the names of the salesmen who use the cash till, and is loosely mounted on a shaft 319. The rod 313 is connected with a two-armed lever 320, the arm 321 of which projects beneath the edge of the slot 294 when the elbow lever arm 301 or the arm 310 connected therewith, is forced by a key out of the position of repose. The extent of the movement of the arms 301 and 310 is limited according to the size of the key used and consequently the extent of the rotation of the type wheel 306 is regulated so that it may be seen by its adjustment what salesman has used the cash till. If the position of the type wheel be marked on a paper band, the use of the cash till may be checked. By the elbow lever arms 301, 310, being forced out of their position of repose, the end of the lever arm 231 is moved within reach of the path of the enlarged part of the key and remains in this position until a key is afresh pushed forward from the key hole into the operating position, whereby the lever arm 321 is forced back and the type wheel 316 moved back into the zero position, before the type wheel can be again adjusted.

The number type wheels 52 (Fig. 3) are mounted on the shaft 319, and are operated by means of toothed wheels from the corresponding number indicating disks 15-19.

Number type wheels 52 are arranged on shafts 322 and 323. Some type wheels 52 gear by means of toothed wheels with the number wheels 10–14 and other type wheels 52 by toothed wheels with the number wheels 5–9. The paper band 54 is drawn past the type wheels, and the printing may be effected by means of suitable auxiliary mechanism.

The hubs of the chain wheels 59, 63, 67, 71, 75 have grooves 326 (Fig. 1) with which the levers 327, for throwing into and out of action, engage, which levers are controlled by cam disks 328 firmly mounted on a shaft 329. The toothed wheel 168 is mounted on this shaft, which wheel has on one side an inclined projection 167 arranged opposite the right hand end of the rod 93 and serves for pushing the rod to the left when the end of the rod encounters the projection.

The coin is conveyed by means of slides into the money piling tubes and during this forwarding movement is tested as to its genuineness. A passage 333 (Fig. 15) in which a slide 334 is movable to and fro, is located under each insertion aperture 332. Apertures 335, 336 and 337 are provided in the bottom of the passage. The apertures 335 are smaller than the apertures 336 and 337, so that spurious coins which pass into this aperture fall through it into a receiving hopper 338. A bridge 339 is provided between the apertures 335 and 337 in the passage 333. The opening in said bridge is of the same width as the apertures 336 but is so low that the genuine coins encounter the bridge and in consequence of the pushing action of the slide 334 are conveyed along the inclined bridge to the aperture 336 which can receive the genuine coins. Coins which are too much worn therefore pass through the bridge aperture to the aperture 337 and from there into the receiver 338.

The genuine coins drop into a passage 339 in front of the slide 340 and are conveyed by the latter to the piling tubes 173. Beneath the aperture 336 there is an aperture 342 adapted to be closed by a closing member 341 through which the coins lying in the passage 339 may be removed when they are not to come into the money piles. The closing member is retained by a pawl 343 which engages in a slot in the casing 1. The slide 334 is connected with a lever 344 and the slide 340 with a lever 345 both of which levers are under the action of springs and are pivotally mounted on a shaft 346. The lever 344 has an arm 348 carrying a roller 347 and the lever 345 an arm 350 carrying a roller 349. The roller 347 rests on a cam disk 351 and the roller 349 on a cam disk 352. These cam disks are firmly mounted on a shaft 353 which is operated by a chain 354 (Fig. 1) which is actuated by the cash till handle 142. The cams are so arranged that a movement of the slides 334 and 340 can only take place when the cash till handle has moved past the shaft 250, that is to say the device provided on the cash till for testing whether the ejecting slide contains sufficient coin. When coin is wanting in the ejecting slides a signal, for instance a red disk 356, (Fig. 4), appears behind apertures 355, which disk is connected with a rod 357 with which one or more rods 227 engage when their respective ejecting slides contain no coin, that is to say make an additional movement to the left.

The coin conveyed to the coin tubes 273 operates a pawl 358 (Fig. 16) which is firmly mounted on a shaft 359 and connected with a lever 360 which operates the ratchet or shifting pawl of the counting mechanism. The ratchet or shifting pawl and the counting mechanism are not shown in the drawings.

The action of the cash till is as follows:— Assuming a purchaser has to pay 15 marks and he tenders 20 marks, the salesman moves the hand lever 83 from O to I and the hand lever 82 from O to V. During the movement of the hand levers the adjustment of the number wheels to the amount to be paid: 15 marks, takes place by means of the chain wheels 64 and 68 coupled with the levers. The salesman then pushes the rod 93 to the right against the toothed wheel 168, whereby the chain wheels 64 and 68 are uncoupled from the hand levers, while the chain wheels 66 and 67 are coupled with the hand lever 82 and the chain wheels 70 and 71 with the hand lever 83 and, by the rack bar 165 and the toothed wheels 161, 162 and 164 the shifting drums are turned forward through 1/10 of their periphery into the zero position. The salesman then turns the hand lever 83 to the number II for the scale and the hand lever 82 to the number X. By this means the rods 275 and 276 are depressed by the levers 270 and 271 respectively acting on the cam disk 279 and the corresponding lever 263 for throwing into and out of action is moved into the annular grooves of the corresponding sleeve 256 and the sleeve 256 moved by the hand lever 82 coupled with the shaft 255. During the second movement of the hand levers 82 and 83 the amount paid: 20 marks, is adjusted by the chain wheels 65 and 79 and, as change or balance of the amount 15 marks, by the chain wheels 67 and 71, and the shifting drums 99 are turned forward through 1/10 and the shifting drums 98 through 5/10. The salesman now unlocks the cash till handle by means of a key and thus turns by means of the toothed segment 283 and the toothed wheel 281 the shaft 255 and the sleeve coupled with it. The pawls 131, 132, 133, of the ratchet wheel 126 of the shifting drum 99 are thereby successively lifted, so that this shifting drum can run back through 1/10 of its periphery taking with it by means of the chain wheel 70 the chain wheel 71 coupled with it and moving back the number wheel coupled with this chain wheel 71 through 1/10 in order that an amount of 5 marks may remain as change.

By means of the unlocked cash till, handle 142 and the shafts which are in engagement with it, are turned, whereby the projection 167 of the toothed wheel 168 first moves the rod 93 together with the disengaging levers 92 to the left in order that the shifting drums and the chain wheels mounted with them on the shaft may leave the indicating members uninfluenced until their return into the position of repose. The testing of the pile of coins then takes place by the turning of the cams 153, 154, 155, the ejecting slide being simultaneously shaken. If there is no 5 mark piece in the corresponding ejecting slide, this slide and its rod 174 connected with the pawl 228 are displaced backward by means of its spring 192 into an inoperative position, in which a broad part of the said rod is beneath the corresponding rider 179. The said pawl 228 is hereby moved up the back of the corresponding elbow lever 108, 109. On turning the toothed wheel 125 and the shifting drum 98 the arm 108 is depressed by means of one of the teeth of the said wheel on the pin 112 locked by means of the rider 179 riding up the broad part of the rod 174, the arm 109 is turned upward, pushes the plate 231 upward by means of the pawl 228 and actuates the bars 239, the lever 241, the pawl 243 of which displaces the disk 246ª to one tooth 247, the ratchet-pawl 132 is coming into the engagement with the ratchet-wheel 126 in order to stop the shifting drum 98 in a new position. In the new position of the shifting drum 98, two teeth of the latter are in the operative position and are ready to actuate two corresponding slides 169, one for a 2 mark piece and the other for a 3 mark piece. These elbow levers deflect to teeth of the shifting drum when the coins are wanting, whereupon the third adjustment of the shifting drum can take place by means of the last of the cams 153, 154, 155, in order, for instance, to eject five separate one mark pieces. Should even these not be present, the deflection of the elbow levers for the third time and also the throwing into action of the shaft 250 for the purpose of locking the handle 142 takes place. If the handle is arrested by the shaft 250 it is turned somewhat backward in order to push back for the purpose of uncoupling, the grippers, which are coupled, for instance, with the pins 188, and thereby to again press up into its original position the previously depressed rider 179 by means of the elbow piece 185 connected with the pins and to bring it out of engagement with the rods 174. If there is a 5 mark piece in the cash, the ejecting slide 169 for the said coin is stopped in its normal position by means of the coin pressed against the pin 172. In the normal position of the ejecting slide, the annular contraction 175 of the rod 174 connected with the said slide is beneath the rider 179. On turning the toothed wheel 125 and the shifting drum 98, one arm 108 being supported by the plate 231 is depressed by means of one of the teeth of the said drum on the pin 112, which pushes down the rider 179 into the annular contraction 175, in order to couple the corresponding ejecting slide with the bar 178 which then by means of the cam disk 202 operated by the cash till handle 142 pushes forward the ejecting slide and ejects the coin. On the ejecting slide being pushed forward the corresponding gripper holds the angle piece 185 depressed, until the contraction 176 has passed through the upper slot of the elbow lever. After the ejection of the coin the ejecting slide is moved back into the initial position by the spring which acts upon it. Before the rotation of the cash till handle 142 is completed, the cam 138 of the shaft 139 presses down the lever arm 135 on the pawls 131–133, and releases them, so that the chain wheels 120–124 can return to their initial position under the action of the helical springs 118.

During the movement of the elbow levers 108 by the shifting drums, that is to say during the testing of the coin pile as to its contents and during the lowering of the riders, the coupling between the chain wheels 58 and 59, 62 and 63, 66 and 67, 70 and 71 and 74 and 75, is released in order that the number wheels indicating the change or balance may remain uninfluenced. The uncoupling of these wheels takes place by means of the cam disk 328 and the lever 327 engaging therewith.

Having now particularly described and ascertained the nature of my said invention and in what manner the same is to be performed, I declare that what I claim is:—

1. In a money changing cash till, the combination of money receptacles and coin ejecting members arranged beneath the same, with a propelling mechanism, change number wheels and ratchet wheels, means to couple the latter with said change number wheels, levers to operate said ratchet wheels in one direction, recoil springs connected with said ratchet wheels and able to move the latter in a reverse direction, catches to stop said ratchet wheels in said reverse direction, cams able to release said catches one after the other, means operated by said levers to throw said cams into their operative position.

2. In a money changing cash till, the combination of money receptacles and coin ejecting members arranged beneath the same, with a propelling mechanism, coupling means to couple said propelling mechanism with said coin ejecting members, ratchet wheels and shifting drums to operate said coupling means, figure disks indicating the change, means to couple said disks with said ratchet wheels, operating means to rotate said ratchet wheels in one direction, recoil springs connected with said ratchet wheels to move the latter in a reverse direction, means to stop said ratchet wheels in a position distant from their zero position by one tenth of one revolution, and means to stop said ratchet wheels in their zero position after their operation by said operating means.

3. In a money changing cash till, the combination of money receptacles and coin ejecting members arranged beneath the same, with a propelling mechanism, coupling means to couple said propelling mechanism with said coin ejecting members, ratchet wheels provided with ten teeth and adapted to control said coupling means, toothed wheels provided with thirty teeth, shifting drums connected with certain of said ratchet wheels and toothed wheels, three pawls having different lengths and engaging in said ratchet wheels, one of said pawls being distant from the next one through a fraction of a tooth-length of said ratchet wheels.

4. In a money changing cash till, the combination of a till handle, with a shaft provided with cams and operatable by means of said till handle, shifting drums, coupling members able to be operated by means of the said drums, coin ejecting slides and a propelling mechanism able to be coupled together by means of said coupling members when operated by said shifting drums, toothed wheels certain of which are connected with said shifting drums, pawls engaging in said toothed wheels for turning the latter, resilient members connecting said levers with said pawls and adapted to be stretched and to allow the pawls when actuated by said levers and cams to be stopped on their way by means of said shifting drums operating said coupling members.

5. In a money changing cash till, the combination of coin ejecting slides arranged beneath money receptacles, with a propelling mechanism, coupling members able to couple said propelling mechanism with said coin ejecting slides, shifting drums elbow levers adapted to be operated by said shifting drums to bring said coupling members into their operative position, contact plates adjustably arranged behind said elbow levers and able when adjusted in their operative position to allow the elbow levers to actuate said coupling members, and means to move said contact plates into and out of their operative position.

6. In a money changing cash till, the combination of coin ejecting slides arranged beneath money receptacles, with a propelling mechanism, coupling members able to couple said propelling mechanism with said coin ejecting slides, shifting drums elbow levers adapted to be operated by said shifting drums to bring said coupling members into their operative position, means operated by said coin ejecting slides to allow the non-acting of said elbow levers on said coupling members on the failure of certain money receptacles.

7. In a money changing cash till, the combination of coin ejecting slides arranged beneath money receptacles, with a propelling mechanism, coupling members able to couple said propelling mechanism with said coin ejecting slides, shifting drums elbow levers adapted to be operated by said shifting drums to bring said coupling members into their operative position, a till handle to move said shifting drums and said propelling mechanism, means operated by said elbow levers on the failure of certain money receptacles to move a locking member into the path of said till handle and to prevent the operation of said coupling members.

8. In a money changing cash till, the combination of coin ejecting members arranged beneath money receptacles, with a propelling mechanism, change number wheels and ratchet wheels, means to couple the latter with said change number wheels, levers for operating said ratchet wheels in one direction, recoil springs connected with said ratchet wheels and able to move the latter in a reverse direction, groups of catches for stopping said ratchet wheels in said reverse direction, means for disengaging said groups of catches after the operation of said coin ejecting members.

9. In a money changing cash till, the combination of a till handle, with a shaft provided with cams and operatable by means of said till handle, brackets movably arranged and operatable by means of said cams, coin ejecting slides connected with rods passing through holes of said brackets and having recesses, braces movably arranged upon said brackets, elbow levers able when operated to move said braces into said recesses, shifting drums operatable by said till handle and operating said elbow levers.

10. In a money changing cash till, the combination of figure disks indicating the change, with scales of figures, indicator-levers moving along said scales, coupling means to couple said figure disks with said indicator levers, ratchet wheels coupled by said coupling means to the figure disks, a till handle to operate said ratchet wheels in one direction, recoil springs to move said ratchet wheels in a reverse direction, and means able when operated by said till handle to bring said indicator-levers out of engagement with said ratchet wheels.

In witness whereof I have set hereunto my signature in presence of two witnesses.

SIEGMUND CHIGER.

Witnesses:
 HENRY HASPER,
 WOLDEMAR HAUPT.